United States Patent

Kuivamäki et al.

[11] Patent Number: 5,899,441
[45] Date of Patent: May 4, 1999

[54] CHAIN HOIST WITH A BRAKE ACTING ON BOTH SIDES OF THE CLUTCH

[75] Inventors: Ismo Kuivamäki, Vantaa, Finland; Helmut Noller, Uttenhofen, Germany

[73] Assignees: R. Stahl Fordertechnik GmbH, Kunzelsau, Germany; KCI Konecranes International PLC, Hyuinkaa, Finland

[21] Appl. No.: 08/607,510

[22] Filed: Feb. 27, 1996

[30] Foreign Application Priority Data

Mar. 2, 1995 [DE] Germany .................. 195 07 190

[51] Int. Cl.⁶ ............................................ B66D 1/14
[52] U.S. Cl. .................. 254/366; 254/372; 254/362; 254/347; 192/90; 475/149; 475/331
[58] Field of Search .................. 254/362, 347, 254/366, 372, 376; 192/90; 475/331, 149

[56] References Cited

U.S. PATENT DOCUMENTS

| | | | |
|---|---|---|---|
| 2,947,393 | 8/1960 | Grover | 192/18 |
| 3,016,118 | 1/1962 | Zatsky | 192/18 |
| 3,399,867 | 9/1968 | Schroeder | 254/376 X |
| 3,756,359 | 9/1973 | Suez et al. | 254/347 X |
| 3,853,303 | 12/1974 | Wineburner | 254/347 X |

FOREIGN PATENT DOCUMENTS

| | | |
|---|---|---|
| 704675 | 3/1965 | Canada .................. 254/362 |
| B-10 45 742 | 12/1958 | Germany . |
| A-33 30 560 | 8/1983 | Germany . |
| A-37 10 332 | 3/1987 | Germany . |
| A-44 08 578 | 3/1994 | Germany . |

*Primary Examiner*—Donald P. Walsh
*Assistant Examiner*—Emmanuel M. Marcelo
*Attorney, Agent, or Firm*—Nilles & Nilles, S.C.

[57] ABSTRACT

In an electric chain hoist, there is a slipping clutch in the drive line which connects the electric motor to the chain sprocket, the slipping clutch acting as an overload safeguard. A holding brake is also provided to hold the drive line in the braked state when the motor is switched off. The brake exerts its braking action primarily on that part of the drive line which lies between the slipping clutch and the chain sprocket. To prevent the slipping clutch from entering the slipping state when the motor is switched on before the brake has been released to a sufficient extent, the brake is designed in such a way that it acts on both parts of the drive line.

19 Claims, 4 Drawing Sheets

5,899,441

CHAIN HOIST WITH A BRAKE ACTING ON BOTH SIDES OF THE CLUTCH

BACKGROUND OF THE INVENTION

DE-A-33 30 560 discloses an electric chain hoist. This electric chain hoist contains, in a housing, an induction motor which is provided with a cylindrical armature and, via a slipping clutch, drives a gear input shaft. The output shaft of the gear is coupled in torsionally rigid fashion to the chain sprocket of the electric chain hoist.

At the end of the armature remote from the gear input shaft there is a cone brake which is preloaded into the braking position by a spring. To release the brake, a solenoid plunger is provided. This solenoid plunger is coaxial with the motor armature and is attracted when the motor is set in rotation.

Owing to the arrangement, the brake acts via the slipping clutch and consequently cannot generate a greater braking torque for the chain than the maximum that the slipping clutch will allow. Since static friction is generally greater than sliding friction, a situation may arise in which the hoist is no longer able to hold a load hanging from the hook, even though the brake is engaged, because the clutch is slipping. Such a situation can arise if, when raising the load, the clutch is initially operated in the static friction range but, because of a fault, for example temporary entanglement of the load with an object, or due to longitudinal vibrations in the chain, the torque limit of the slipping clutch is then exceeded and the clutch passes into the state of sliding friction. Even if the armature is then stopped and the holding brake is applied, the load continues to fall since the slipping clutch may no longer be able to return to the state of static friction from the state of sliding friction.

It is therefore expedient to place the brake in that part of the drive line of the hoist which comes after the slipping clutch, taking the motor as the starting point.

One such solution is, for example, known from DE-A-44 08 578, which is not a prior publication. The braking torque can be set independently of the slipping torque of the slipping clutch and, as a result, the hoist is capable of holding loads reliably even when the slipping clutch has already started to slip under limiting-load conditions.

With this solution, however, the time relationship between the starting of the motor and the release of the brake must be maintained with great precision. If, for example, the brake were released more rapidly than the motor can start up while raising a load, the load would initially sink before being raised by the motor. If, conversely, the motor started up first and the brake were released afterwards, the applied brake would cause the slipping clutch to slip and it would then be possible to raise only a relatively small load with the hoist, in accordance with the friction coefficient under conditions of sliding friction.

The solution given in DE-A-37 10 332 avoids this problem by using a sliding rotor motor which ensures synchronicity between the motor and the brake with absolute reliability. However, such sliding rotor motors with a conical armature are very expensive to manufacture.

OBJECTS AND SUMMARY OF THE INVENTION

Taking this state of affairs as a starting point, it is an object of the invention to provide a hoist in which the braking torque is independent of the set slipping torque of the slipping clutch and in which there is no danger that the brake will cause the slipping clutch to slip.

In the novel brake, the design of the rotatable brake members revolving with the clutch ensures that the input and output sides of the brake are each braked independently. This ensures that the clutch is held in the non-slipping state until the brake is released because the set friction torque of the clutch has no effect on the braking action. Like the input side of the brake, which is coupled directly to the motor, the output side is also braked, with the result that the motor is halted until the brake is released. This makes possible free selection of the time sequence for the switching on of the motor and the switching on of the brake release magnet, within certain limits. It must merely be ensured that the brake release magnet is not switched on before the motor. Under these circumstances, the clutch, with the load hanging from the hook, starts up in the state of static frictional engagement, and this gives rise to reproducible conditions every time.

On the other hand, the maximum braking torque is not limited by the frictional grip in the friction clutch because the output side of the clutch is also braked in its own right. If the slipping clutch is intact, a corresponding frictional braking force is additionally transmitted from the input side to the output side, to the respectively required side. As a result, the arrangement is mechanically redundant and provides a high degree of safety—in the sense of braking of the load—even if the slipping clutch has been contaminated with oil.

Floating mounting is not required either for the clutch subassembly or the brake subassembly if two brake members are provided which interact in an axially displaceable fashion with the associated clutch disk. In this case, the brake members can be designed in a very simple manner as rings which are seated on the outer circumferential surface of the relevant clutch disk and which are connected to the relevant clutch disk in a torsionally rigid fashion by means of tooth profiling, for example.

In a simpler solution, just one displaceable brake member is provided, while the other brake member is formed by part of the clutch disk.

Instead of disk-shaped brake backplates with a flat or frustoconical friction surface as the fixed brake backplates, it is also possible to use a brake band which is placed around the clutch disks and which acts on their circumference.

BRIEF DESCRIPTION OF THE DRAWINGS

Exemplary embodiments of the subject-matter of the invention are illustrated in the drawing, in which.

DETAILED DESCRIPTION OF THE PREFERRED EMBODIMENTS

Figure 1:
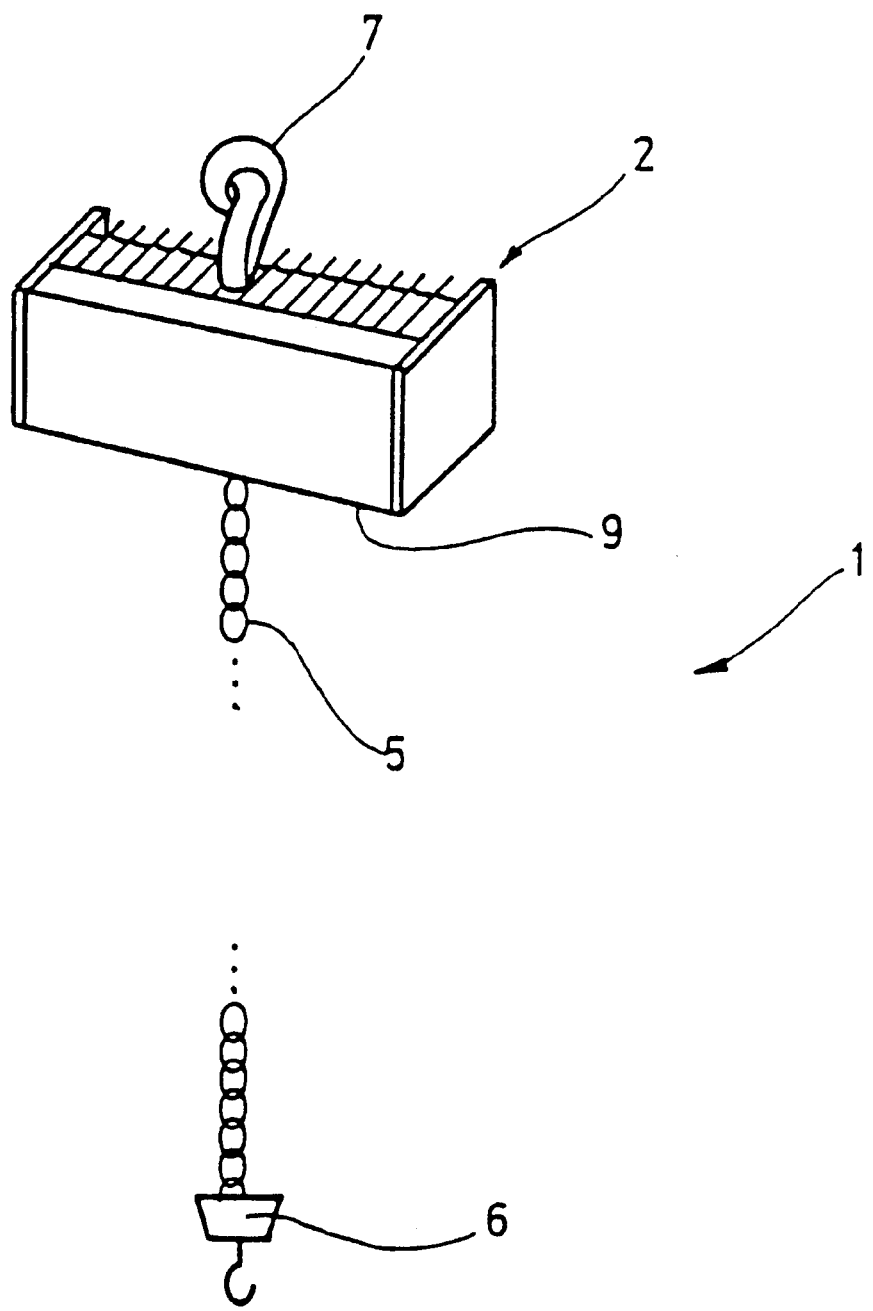
FIG. 1 shows a chain hoist in a perspective representation.
Figure 2:
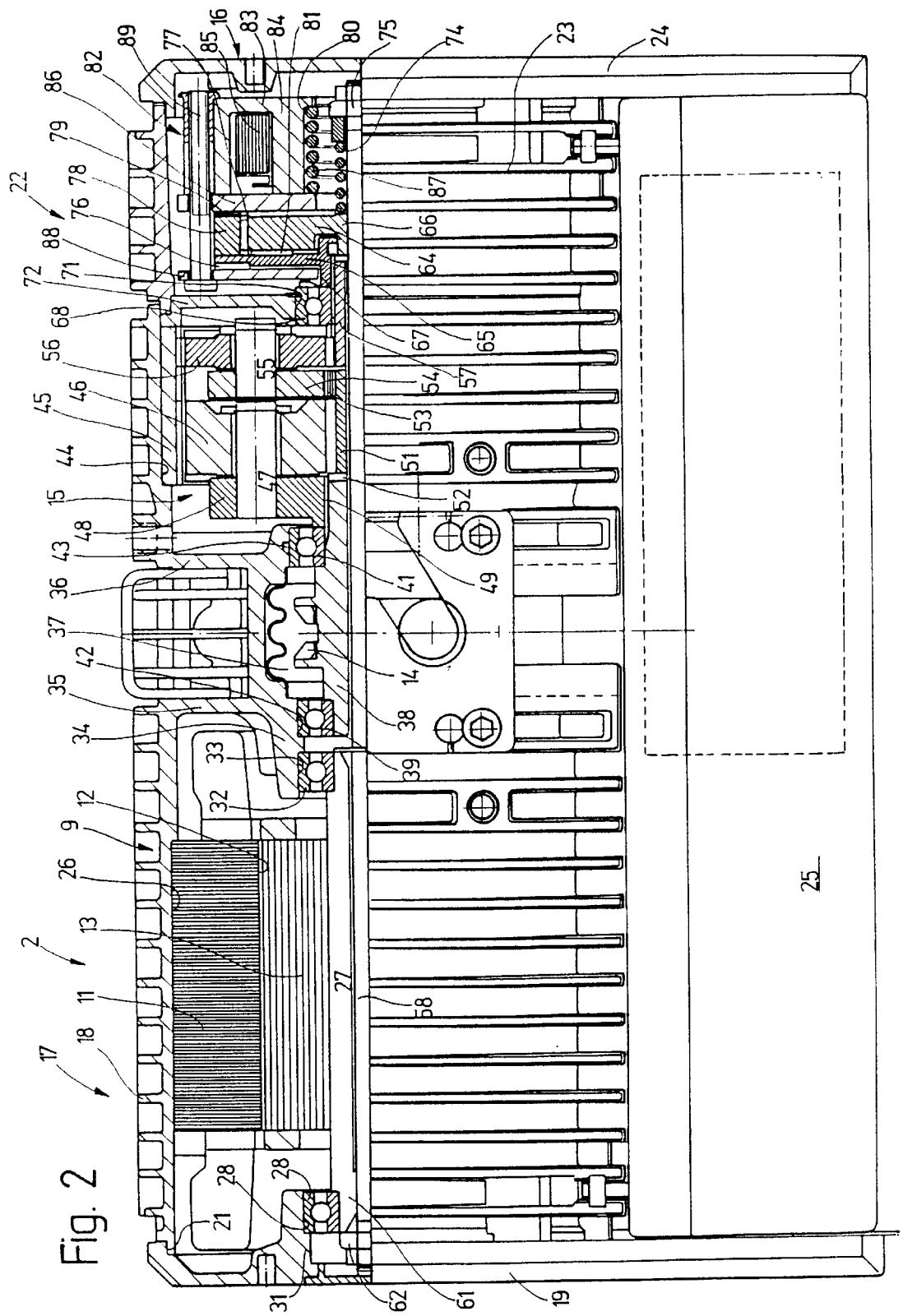
FIG. 2 shows the chain hoist shown in FIG. 1 in a partial longitudinal section.

FIG. 1 shows, in highly schematized form, a chain hoist 1 with a housing 2 in which there is arranged a drive mechanism (FIG. 2). Emerging from the underside is a round-link chain 5, to the bottom end of which a hook tackle 6 is attached. The chain hoist 1 is attached to a fixed structure (not shown) by means of a hook 7.

As the section shown in FIG. 2 shows, the drive mechanism comprises an asynchronous motor 9 with a field winding 11, in the cylindrical hole 12 of which there runs a cylindrical cage rotor 13. The drive mechanism also includes a chain sprocket 14, visible only in section, on that side of which is remote from the motor 9 there is arranged a two-stage planetary gear 15. Next to the two-stage planetary gear 15 there is a combined clutch and brake device 16, which is situated in the drive line between the motor 9 and the chain sprocket 14. The clutch device divides the drive line into two sections.

The housing 2 of the chain hoist 1 comprises a central piece 17 which, on its outer circumferential surface, bears ribs 18 which run in the circumferential direction and, as seen in the transverse direction, impart to the housing 2 an approximately rectangular outline. By virtue of the ribs 18, the housing has a constant and continuous external shape along its length while, in fact, the actual body of the housing is essentially tubular.

The left-hand end of the central piece 17 is closed off by means of a cover 19 which is held in the correct position on the central piece 17 by complementary centering shoulders 21. Adjoining the central piece 17 at the right-hand end is a brake housing 22 with the same external shape in outline, in which the combined clutch and brake device 16 is accommodated. The brake housing 22 is likewise provided with corresponding cooling ribs 23 which lie in the circumferential direction.

That end of the brake housing 22 which is remote from the central piece 17 is closed off by another end cover 24, which is essentially a mirror image of end cover 19.

Both end covers 19 and 24 project laterally beyond the housing 2 on the same side, thereby forming an approximately C-shaped side opening. Accommodated in this side opening is a control housing 25 which contains connection terminals, contactors, electronic control systems and the like (not shown). The projecting covers 19, 24 at the sides protect the control housing 25, which is generally made of a plastic, and balance the chain hoist 1 in relation to its longitudinal axis. If the weight of the covers 19, 24 is not sufficient, additional weights can be mounted in the covers 19, 24.

Leading from end cover 19 into the central piece 17 is a circular hole 26 into which the core assembly of the stator 11 is shrink-fitted, being held fast by friction. The armature 13 is seated in torsionally rigid fashion on a hollow shaft 27 which is supported at the left-hand end by means of a deep-groove ball bearing 28 seated in a cylindrical bearing hole 29 coaxial with hole 26. This hole 29 is situated in an inward-pointing tubular extension 31 of end cover 19. To support the other end of the hollow shaft 27 there is a deep-groove ball bearing 32 which is a wringing fit in a bearing hole 33. The bearing hole 33 is situated in a tubular extension 34 which projects into hole 26 from a dividing wall 35 formed integrally in the central piece 17.

At a distance from the dividing wall 35, the central piece 17 contains another dividing wall 36, a chain-sprocket housing 37 thereby being partitioned off between the two dividing walls 35 and 36. The chain sprocket 14 which runs within it is of integral construction with a hollow shaft 38 which is mounted rotatably on both sides of the chain sprocket 14 in two deep-groove ball bearings 39 and 41. The two deep-groove ball bearings 39 and 41 are mounted in associated bearing holes 42 and 43. Bearing hole 42 is arranged in the tubular extension 34 in coaxial alignment with bearing hole 33, while bearing hole 43 is arranged in a corresponding boss on dividing wall 36. The diameter of bearing hole 43 is chosen such that both deep-groove ball bearing 39 and the chain sprocket 14 can be inserted from the right in FIG. 2, since the diameter of bearing hole 43 is greater than the maximum diameter of the chain sprocket 14.

To the right of dividing wall 36, the interior of the housing 2 widens, and in this area of the housing there is a hole 44 which is coaxial with bearing holes 42 and 43 and into which is shrink-fitted an internal gearwheel 45 common to both stages of the two-stage planetary gear 15. The stage adjacent to the chain sprocket 14 comprises three planet wheels 46, which are rotatably mounted on spindles 47 of an associated planet carrier 48 and mesh with the internal gearwheel 45. The planet carrier 48 is connected in torsionally rigid fashion by means of tooth profiling 49 to a stub of the hollow shaft 38, said stub projecting beyond deep-groove ball bearing 41 on the right-hand side.

By means of the three planet wheels 46 of the second stage, the sun wheel 51 of this stage is supported in such a way as to be able to float. The length of the sun wheel 51 is greater than the width of the planet wheels 46, with the result that it projects beyond the planet wheels 46 on the right-hand side when it runs up against the adjacent end of the shaft 38 on the left-hand side, with which it makes contact via a washer 52. The projecting part of the sun wheel 51 projects into a hole 53 with complementary teeth in a planet carrier 54 of the first stage of the two-stage planetary gear 15. Seated on the spindles 55 of the planet there are, once again, a total of three planet wheels 56 which support an associated sun wheel 57 in such a way that it can float, this sun wheel likewise projecting on the right-hand side and protruding into the brake housing 22.

The kinematic connection between the motor 9 and the planetary gear 15 is made by means of a stub shaft or intermediate shaft 58 provided on its outside with continuous tooth profiling. In the left-hand end of the hollow shaft 27 of the armature 13 there is a section 61 provided with tooth profiling, this section being complementary with the tooth profiling of the stub shaft 58. From here, the stub shaft 58 passes through hollow shaft 27, through the hollow shaft 38 of the chain sprocket 14, and from there through the hollow sun wheel 51 and through sun wheel 57 into the combined clutch and brake unit 16; the stub shaft 58 may be provided with additional support in sun wheel 57. At its left-hand, motor-side end, the stub shaft 58 is secured axially in the rightward direction by a nut 62 which is screwed onto a corresponding thread on the stub shaft 58 and is supported against the end of the hollow shaft 27. Otherwise, the stub shaft 58 is free to rotate relative to sun wheel 51, sun wheel 57 and the chain-sprocket shaft 38.

The combined clutch and brake unit 16 has two mutually parallel, flat and annular clutch disks 64 and 65, which are in frictional engagement with one another, for which purpose, as illustrated, they carry appropriate friction facings. For reasons connected with heat, it is advantageous to make the clutch disk 64 or 65 which does not have a friction facing relatively thick in order to give it a large heat capacity and thereby ensure that the clutch can rub for a ralatively long time without damaging the friction facing. Instead of the flat configuration of clutch disks 64 and 65 which is illustrated, they can also carry conical friction surfaces.

Clutch disk 64 is the driven disk, for which reason it is provided with a hub 66 which is coupled to the stub shaft 58 by means of tooth profiling complementary with the tooth profiling of the stub shaft 58 in such a way that it can be displaced axially on the stub shaft but is coupled in torsionally rigid fashion to the stub shaft 58. The other clutch disk, clutch disk 65, is the output-side clutch disk, which is freely rotatable relative to the stub shaft 58. Clutch disk 65 is likewise provided with a hub 67, and this hub bears internal toothing corresponding to the external toothing of sun wheel 57. As illustrated, sun wheel 57 is extended in the direction of the clutch and brake unit 16 and, with this extended portion, projects into the hub 67 of clutch disk 65. In this way, an axially displaceable but torsionally rigid connection is established between clutch disk 65 and sun wheel 57.

Support is provided by means of a deep-groove ball bearing 68 which is seated in a hole 71 in a dividing wall 72 of the brake housing 22. By means of this deep-groove ball bearing 68, sun wheel 57, which extends through the deep-groove ball bearing 68 and over which the hub 67 fits, is rotatably mounted. The bearing 68 is secured axially by means of a snap ring which is seated in a corresponding annular groove and which secures the bearing 68 in the direction of the left-hand side. The end of the hub 67 rests against the inner race of the bearing 68. An axial force acting on clutch disk 65 in the right to left direction is transmitted to the central piece 17 of the housing via the hub 67 and the snap ring.

In order to generate the preload by means of which the two clutch disks 64 and 65 are held in frictional engagement, a helical spring 74 acting as a compression spring which can be preloaded by means of a nut 75 screwed onto a corresponding thread on the stub shaft 58, is seated on a portion of the stub shaft 58 which projects beyond clutch disk 64 on the right-hand side. There may be shims between the nut 75 and the spring 74, on the one hand, and between the spring 74 and the hub 66 of clutch disk 64, on the other hand. Although these are illustrated in the drawing, they do not bear reference numerals.

Clutch disk 65 also gets as a brake disk, for which reason it is provided with a brake lining 76 on its outward-facing surfaces.

This brake lining 76 is situated in an area of clutch disk 65 which projects radially beyond the outer circumference of clutch disk 64.

The outer circumference of clutch disk 64 is provided with tooth profiling 77 on which a brake ring 78 is seated in such a way as to be axially displaceable but nonrotatable relative to clutch disk 64 by means of complementary tooth profiling. On its side remote from clutch disk 65, this brake ring is provided with another brake lining 79, while the side facing clutch disk 65 does not carry an additional friction facing of this kind.

It can furthermore be seen from FIG. 2 that the inside diameter of the brake ring 78 is greater than the outside diameter of a clutch lining 81 applied to clutch disk 65.

The two brake linings 76 and 79 interact with a fixed brake device 82. This fixed brake device 82 comprises an electromagnet 83 which is axially displaceable in the brake housing 22 and which has a cup-shaped iron yoke 84 and a magnet winding 85 located therein. The iron yoke is secured against rotation in the brake housing 22 by means of guide grooves in the housing, in which corresponding extensions of the iron yoke 84 slide.

The iron yoke 84 is arranged in such a way that its open end faces in the direction of the two clutch disks 64 and 65. The iron yoke 84 also contains a through hole 80 through which the stub shaft 58 passes.

Arranged in front of the opening of the iron yoke 84 is an annular brake backplate 86 which is preloaded in the direction of clutch disk 64 by means of the helical compression spring 87. This spring 87 is supported against an opposing rearward shoulder of the hole 85. There is another annular brake backplate 88 between clutch disk 65 and dividing wall 72. This brake backplate 88 is connected to the yoke 84 in a manner which prevents rotation but allows axial displacement by means of a plurality of screws 89. For this purpose, the yoke 84 contains threaded bushes into which the screws 89 are screwed.

Figure 3:
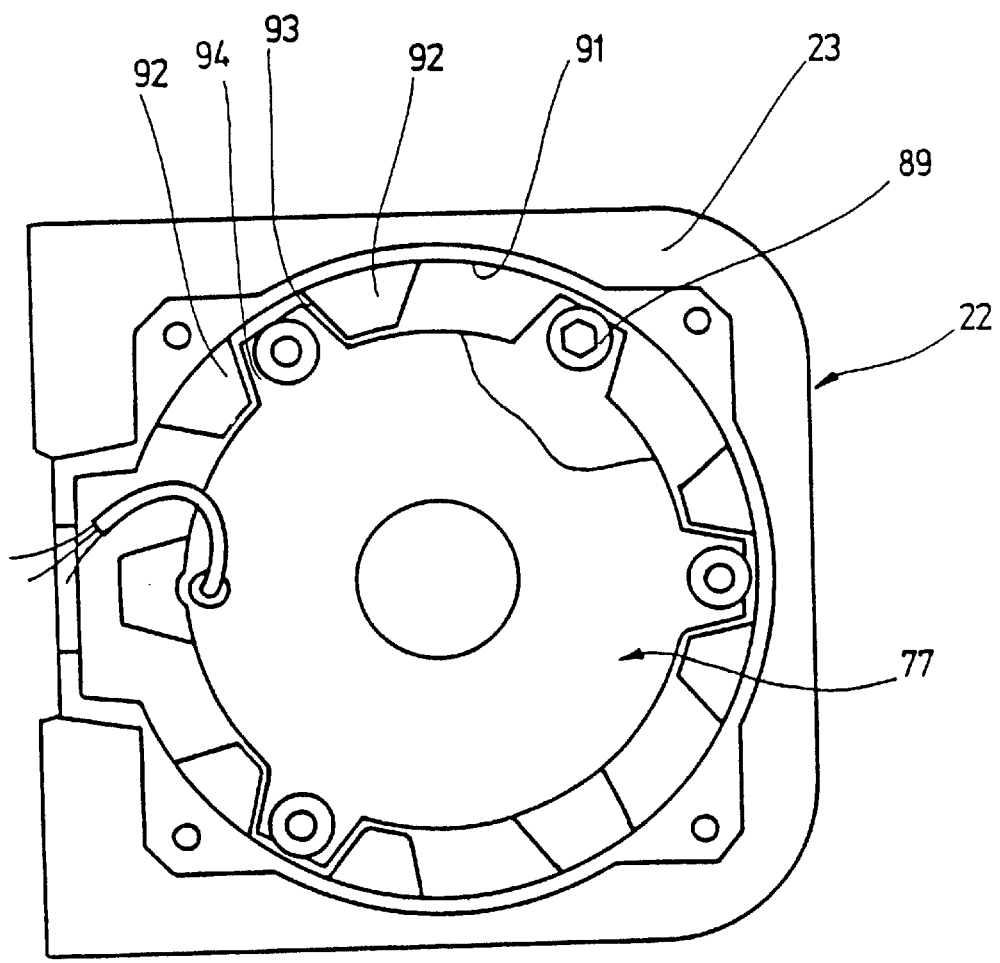
FIG. 3 shows an end view of the clutch and brake unit.

Finally, FIG. 3 shows an end view of the rear side of the brake device 82. As can be seen there, the brake housing 22 has on its inside 91 a multiplicity of ribs 92 which extend parallel to the axis of the stub shaft 58 and respective pairs of which delimit grooves 93. Located in longitudinally displaceable fashion in a these grooves 93 are extensions 94 which are provided on the magnet yoke 84, brake backplate 86 and brake backplate 88. The interaction of these extensions 94 with the grooves 93 secures the brake unit 82 against rotation in the brake housing 22 and, with the brake released, prevents it from tilting to such an extent that non-uniform wear could occur in the lower area of the brake backplates 86 and 88.

The chain hoist 1 described thus far is assembled as follows:

The holes 26, 44 and the bearing holes 33, 42 and 43, including the shoulder 21 on which the bearing cover 19 is subsequently seated, are first of all machined coaxially with one another and inserted in fully finished form into the unfinished casting. The stator 11 and the internal gearwheel 45 are then shrink-fitted into the associated holes 26 and 44 in the central piece 17.

Once this has been done, bearing 32, followed by the armature 13 together with its hollow shaft 27, are inserted. The bearing cover 19 together with the bearing 29 seated therein are then attached to the central piece 17 of the housing.

This is followed by insertion of the chain sprocket 14, which, as mentioned above, is in one piece with its associated shaft 38, and insertion of bearings 39 and 41. The planetary gear 15 is then installed, and the brake housing 22 mounted thereon. The preassembled combined clutch and brake unit 16 can then be secured in the brake housing 22.

Assembly of the combined clutch and brake unit 16 is performed in parallel with the assembly operation described above. The procedure is as follows: after the insertion of the compression spring 87, brake backplate 86, clutch disk 64 together with the brake ring 78 seated on it, clutch disk 65 and, finally, brake backplate 88 are placed on the magnet yoke 84 in the positions described. The screws 89 are then screwed into the magnet yoke 84. The screws 89 are screwed in until the desired air gap—which subsequently defines the release clearance when the brake is released—is achieved between the relevant end of the magnet yoke 84 and the directly adjacent brake backplate 86. The clutch and brake unit 16 as thus preassembled is mounted by means of the hub 67 on the stub of the sun wheel 57 which protrudes from the ball bearing 68.

The stub shaft 58 is inserted from the motor side until it takes up the position shown in FIG. 2. The compression spring 74 is placed on the portion situated in the hole 65 in the magnet yoke 84 and is preloaded to the appropriate extent by means of the screwed-on nut 75.

As the final stage, the end cover 24 can be placed on, thereby completing the process of mechanical assembly in this respect.

The chain hoist described, in particular the combined brake and clutch unit 16, operates as follows:

From the compression spring 74, the force which serves to preload the two clutch disks 64 and 65 into frictional engagement with one another is transmitted to the nut 75, which transmits it to the stub shaft 58. The stub shaft 58 is supported against the hollow shaft 27 of the motor 9 via the nut 62. The axial force thus acting on the hollow shaft 27 is transmitted by deep-groove ball bearing 32 to the central piece 17 of the housing, which transmits the force to the dividing wall 72 of the brake housing 22. Resting against the dividing wall 72, by means of the snap ring, is ball bearing 69, against which the hub 67 abuts. From the hub 67, the force transmission loop is completed via clutch disk 65, from which the force flows to clutch disk 64 and from there, via its hub 66, to compression spring 74. The force with which the two clutch discs 64 and 65 are in frictional engagement is thus generated with the aid of compression spring 74.

The preloading force between the clutch disks 64 and 65 is not prejudiced by the brake device 82.

With the brake device 82 applied, the two brake backplates 88 and 86 are pressed together by compression spring 87. Here, the force is transmitted from compression spring 87 via brake backplate 86, from there to the brake lining 79 and the axially displaceable brake ring 78 and thus past clutch disk 64. The preloading force presses the brake ring 78 against the relevant flat adjacent face of an annular surface formed integrally on clutch disk 65. From here, the force passes via clutch disk 65 to brake lining 76 and from there to the rotationally fixed backplate 88. The latter is connected to the magnet yoke 84 by the screw 89, thus closing the force transmission loop back to compression spring 87.

As can be seen from the action of the force transmitted, the compression spring 87 does not alter the frictional grip in the slipping clutch formed by clutch disks 64 and 65 and the friction facing 81. The frictional grip at the said location is defined exclusively by the preloading force of compression spring 74. Even in the applied state, the distance between brake backplates 86 and 88 is greater than the axial thickness of clutch disks 64 and 65, and the two brake backplates 86 and 88 thus do not rest simultaneously on clutch disks 64 and 65.

The preloading force exerted by compression spring 87 is likewise routed past the slipping clutch.

In the applied state of the brake device 82, clutch disk 64 is on one side braked directly against the rotationally fixed brake backplate 86 because the brake ring 78 is connected in torsionally rigid and axially displaceable fashion to clutch disk 64. That part of the transmission line which connects the motor 9 to the chain sprocket 14 which is adjacent to the motor 9 is thus braked directly.

Clutch disk 65, which is associated in terms of its drive with the chain sprocket 14, is braked separately and independently by means of the rotationally fixed brake backplate 88 since it carries the annular brake lining 76 on its surface adjacent to this brake backplate 88.

In this embodiment, both the input member and the output member of the slipping clutch are braked separately.

If, in this arrangement, the current for the motor 9 is switched on first, and the electromagnet 83 of the brake device 82 is switched on only after a delay, then the armature 13 remains locked irrespective of the frictional engagement between the clutch disks 64 and 65. This is ensured by the frictional grip between brake backplate 86 and the brake ring 78, which is coupled in torsionally rigid fashion to the armature 13 by way of clutch disk 64. Only when, soon afterwards, the electromagnet 83 is switched on and brake backplate 86 is drawn against the magnet yoke 84 does the braking force disappear, allowing the motor 9 to impart rotation to the stub shaft 58. If the load hanging from the chain (not shown) is higher than the permissible limiting load, the chain sprocket 14 will also be set in motion via the planetary gear 15. If, on the other hand, the attached hook load is too large, the slipping clutch formed by the two clutch disks 64 and 65 slips, the slipping torque being defined exclusively by the preload of compression spring 74.

The significant point here is that, owing to the arrangement chosen, the slipping clutch has in each case been in the state of static friction up to the release of the brake, i.e. the switching on of the electromagnet 83. Even if the electromagnet 83 is only switched on after the motor 9 is switched on, the slipping clutch never enters the state of sliding friction before this takes place. Irrespective of the time relationships, exactly reproducible conditions of frictional engagement between the two clutch disks 64 and 65 are thus established and, in particular, this does not depend on the delay with which the electromagnet 83 is switched on relative to the motor 9 or whether both are activated simultaneously.

On the other hand, the novel solution has the considerable advantage that the braking torque with which the chain sprocket 14 can be braked does not depend on the slipping torque of the safety clutch.

If there were too great a load hanging from the hook 6, generating a higher torque between the two clutch disks 64 and 65 than that required to overcome the static friction between these two clutch disks 64 and 65 with the brake released, it would be possible to bring the load to a halt again at any time. It is sufficient for the operator to switch the chain hoist 1 off because the electromagnet 83 is then immediately deenergized, bringing compression spring 87 back into action and braking clutch disk 65 solidly against the rotationally fixed brake backplate 88, irrespective of the slipping torque set by means of compression spring 74.

Additional security is obtained in the solution indicated by the fact that both the input-side and the output-side clutch disk 64, 65 are provided with their own brake lining 76, 79, so that, even if the slipping clutch fails, reliable braking is guaranteed. Since both clutch disks 64 and 65 are provided with their own friction brake lining 76, 79, each clutch disk 64, 65 is braked independently by the associated brake backplate 86 and 88, respectively, i.e. both the motor side and—even more importantly—the output side and hence the chain-sprocket side are braked solidly.

If, on the other hand, it were the output-side brake lining 76 of clutch disk 65 which failed while the clutch itself remained fully functional, reliable braking would still take place since the braking action would then be performed by means of clutch disk 64 and the static friction between the clutch disks 64 and 65.

The floating mounting of the brake unit 78 is intended to ensure that both brake backplates 86 and 88 can be applied in the same way and that no bending forces occur at clutch disk 65.

Figure 4:
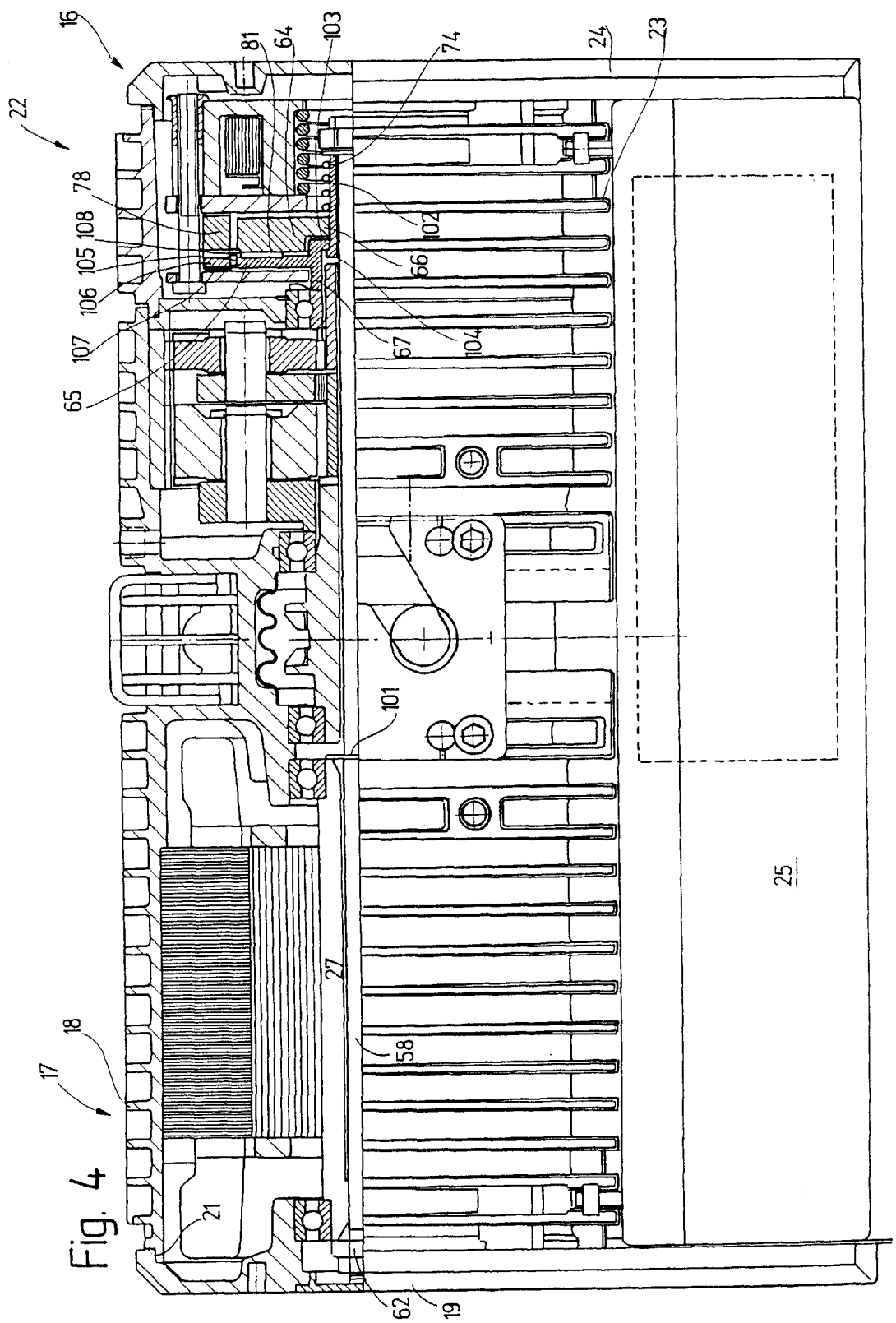
FIG. 4 shows another exemplary embodiment of the chain hoist shown in FIG. 1, in a representation similar to that in FIG. 2.

FIG. 4 shows an exemplary embodiment of the combined clutch and brake unit 16 in which the braking magnet 84 can be screwed rigidly into the brake housing 22. In the text which follows, a description is given only of those parts of the clutch and brake unit 16 which differ from those in the exemplary embodiment shown in FIG. 2.

The stub shaft 58 is provided in the region of the inner end of the hollow shaft 27 with a groove in which there is a snap ring 101. By tightening the nut 62, the stub shaft 58 is gripped in the hollow shaft 27 and secured axially in both directions. The stub shaft 58 projects only partially into the brake unit 82. It ends approximately below clutch disk 64, inside a hollow bolt 102, which is provided with corresponding tooth profiling and on the outer circumferential surface of which compression spring 74 is arranged. The hollow bolt 102 is provided with further, external tooth profiling, on which clutch disk 64 is arranged in longitudinally displaceable but torsionally rigid fashion by means of its hub 66.

The hub 67 of clutch disk 65 is provided with a shoulder 103 which projects radially inwards and against which a radially outward-pointing collar 104 on the hollow bolt 102 rests. In this way, the two clutch disks 64 and 65 are elastically preloaded in a direct way by means of spring 74 on the hollow bolts 102 setting up a frictional grip between these two clutch disks 64 and 65 by way of clutch lining 81, which is, for example, attached to clutch disk 64.

The arrangement of clutch disks 64 and 65 on the hollow bolt 102 gives rise to a self-contained subassembly, and, with this subassembly, it is possible to preset the frictional torque between the clutch disks 64 and 65 before the chain hoist 1 as a whole is assembled.

In other respects, clutch disk 64 is embodied in the same way as in the exemplary embodiment shown in FIG. 2, i.e. it carries the outer brake ring 78 already described.

Clutch disk 65 is modified in comparison with the exemplary embodiment of FIGS. 1–3 by likewise being provided on the outer circumference with tooth profiling 105, on which there is arranged in torsionally rigid and axially displaceable fashion a second brake ring 106, which bears friction brake linings 107 and 108, respectively, on both sides.

The brake unit 82 operates as follows:

With the brake unit 82 applied, the two brake backplates 86 and 88 are pushed towards one another like tongs by compression spring 87, pressing the two brake rings 78 and 106 together between them. In the applied state, the distance between the brake backplates 86 and 88 is sufficiently large to ensure that no axial force is exerted directly on the two clutch disks 64 and 65 by the brake backplates 86 and 88. The frictional grip between the two clutch disks is thus unaffected. Once again, as in the above exemplary embodiment, each of the two clutch disks 64 and 65 is furthermore braked independently on the associated brake backplate 86 and 88, respectively, by way of the ring 78, 106 arranged in torsionally rigid fashion on its outer circumference.

The friction facing 108 between the two brake rings 78 and 106 serves to improve safety, i.e. it represents a kind of mechanical redundancy in the event that the clutch friction lining 81 should fail. If this situation occurs, an overload on the hook 6 will render the brake backplate 86 that brakes the input of the slipping clutch virtually useless because the friction clutch formed by clutch disks 64 and 65 can no longer transmit torque. In order to allow the brake backplate 86 acting on the input side nevertheless to assist the action of the output-side brake backplate 88 in this case, there is also the friction brake lining 108 between the two brake rings 78 and 106, this brake lining ensuring that the two brake rings 78 and 106 are coupled together with a significant degree of frictional grip. In accordance with the frictional grip between the brake rings 78 and 106, the braking action between brake ring 78 and the rotationally fixed backplate 86 can also be transmitted to the output side in terms of the power flow.

The significant advantage of the arrangement shown in FIG. 4 is that floating mounting of the brake unit 82 is no longer necessary since the two brake rings 78 and 106 can be displaced in free-floating fashion against the associated clutch disks 64 and 65 in the axial direction.

Another advantage of this solution is that the brake linings 76 and 79 operate with a larger effective radius than clutch friction lining 81.

We claim:

1. A chain hoist comprising:

a drive motor;

a gear which is coupled to the drive motor and which has at least one input shaft and one output shaft, wherein the gear is connected to a load-lifting device, and, together with the drive motor and the load-lifting device, forms a drive line;

a brake device which acts on the drive line and which has at least one non-rotatable brake member and at least two brake members which rotate with the drive line;

a selectively releasable brake preloading device configured to preload the two rotatable brake members and the non-rotatable brake member into frictional engagement with one another; and a slipping clutch which divides the drive line into two sections and which has at least one driven clutch member and at least one driving clutch member which are preloaded into frictional engagement with one another by a clutch preloading device, wherein 1) one of the rotatable brake members is connected to the driven clutch member so as to be incapable of rotating with respect to the driven clutch member and 2) the other of the rotatable brake members is connected to the driving clutch member so as to be incapable of rotating with respect to the driving clutch member.

2. The hoist as claimed in claim 1, wherein two non-rotatable brake members are provided, each of which is associated with a respective rotatable brake member.

3. The hoist as claimed in claim 1, wherein the rotatable brake members are situated in such proximity to one another that they are in frictional engagement with one another when the brake device is applied.

4. The hoist as claimed in claim 1, wherein at least one of the rotatable brake members is formed by a ring which coaxially surrounds the associated clutch member.

5. The hoist as claimed in claim 4, wherein the ring is axially displaceable relative to the associated clutch member.

6. The hoist as claimed in claim 1, wherein each of the rotatable brake members coaxially surrounds the associated clutch member and is axially displaceable relative to the associated clutch member.

7. The hoist as claimed in claim 1, wherein one of the rotatable brake members and the associated clutch member are integral with one another.

8. The hoist as claimed in claim 1, wherein the non-rotatable brake member is in the form of one of a flat disk and a truncated cone.

9. The hoist as claimed in claim 1, wherein the slipping clutch is arranged between two rotationally fixed brake members.

10. The hoist as claimed in claim 1, wherein the non-rotatable brake member has a flat braking surface.

11. The hoist as claimed in claim 1, wherein the clutch members are disk-shaped.

12. The hoist as claimed in claim 1, wherein the brake preloading device comprises a spring.

13. The hoist as claimed in claim 12, further comprising a brake release device which acts counter to the spring.

14. The hoist as claimed in claim 1, wherein the drive motor acts on the input shaft of the gear via the slipping clutch.

15. The hoist as claimed in claim 1, wherein the non-rotatable brake member is mounted in such a way that the non-rotatable brake member floats parallel to an axis of rotation of the slipping clutch.

16. The hoist as claimed in claim 1, wherein the non-rotatable brake member is guided in such a way in a direction parallel to an axis of rotation of the slipping clutch that the rotationally fixed brake member tilts in a released state of the brake device.

17. The hoist as claimed in claim 1, wherein the clutch preloading device comprises a spring.

18. The hoist as claimed in claim 1, further comprises a brake release device which comprising an electromagnet.

19. A chain hoist comprising:

a drive motor;

a gear which is coupled to the drive motor and which has at least one input shaft and one output shaft, wherein the gear is connected to a load-lifting device, and, together with the drive motor and the load-lifting device, forms a drive line;

a brake device which acts on the drive line and which has at least one non-rotatable brake friction disk and at least two brake friction disks which rotate with the drive line;

a selectively releasable brake preloading device configured to preload the two rotatable brake friction disks and the non-rotatable brake friction disk into frictional engagement with one another; and a slipping clutch which divides the drive line into two sections and which has at least one driven clutch friction disk and at least one driving clutch friction disk which are preloaded into frictional engagement with one another by a clutch preloading device, wherein 1) one of the rotatable brake friction disks is connected to the driven clutch friction disk so as to be incapable of rotating with respect to the driven clutch friction disk and 2) the other of the rotatable brake friction disks is connected to the driving clutch friction disk so as to be incapable of rotating with respect to the driving clutch friction disk.

* * * * *